Figure 1:
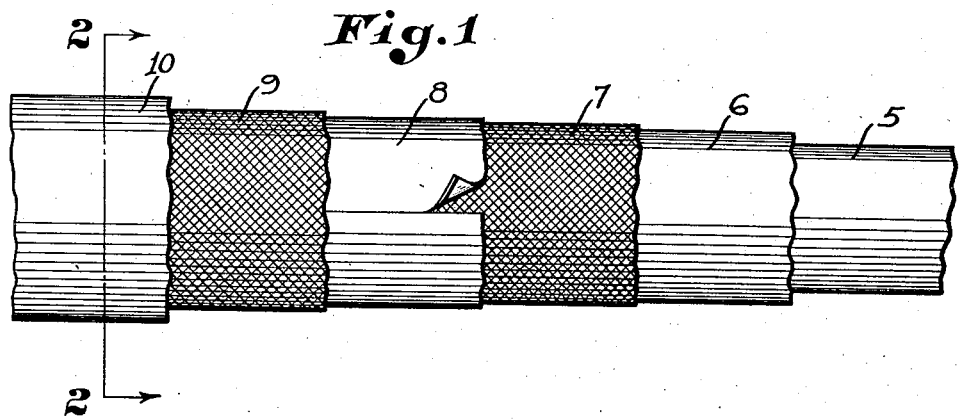

March 17, 1936.   C. W. GREENE   2,034,654
HOSE
Filed Oct. 19, 1932

Inventor
Charles W. Greene
By Owen & Owen
Attorneys

Patented Mar. 17, 1936

2,034,654

UNITED STATES PATENT OFFICE 2,034,654

HOSE

Charles W. Greene, Toledo, Ohio, assignor to The De Vilbiss Company, Toledo, Ohio, a corporation of Ohio Application October 19, 1932, Serial No. 638,537

1 Claim. (Cl. 138—55)

This invention relates to hose especially adapted for use in spray coating. Rubber hose, as ordinarily made, is unsuitable for this purpose, since lacquer solvents, oils and other ingredients commonly used in various coating materials, upon continued contact with the hose, tend to soften the rubber or to cause it to swell or disintegrate.

The best grade of hose, as heretofore used in spray coating apparatus, has two or more plies of fabric with a cementing layer of rubber therebetween, covered outside and inside with layers composed largely of rubber. In an endeavor, as far as possible, to prevent deterioration of the inside layer in contact with the coating fluid, the rubber content of the inside layer or liner has been reduced to 40% or less, with the remainder composed of inert material, but in doing so, the flexibility and other desirable characteristics due to the rubber are correspondingly reduced. Experience has demonstrated that a rubber content of 30% to 40% is the most satisfactory compromise that can be made.

As a consequence of such a change in the composition of the liner, the hose can seldom be used to advantage for a longer period than one year. Usually by that time pieces of the liner will collect in the hose passage and block the flow of coating fluid, or will pass into the spray nozzle and necessitate the dismantling thereof. The walls of the hose are sometimes considerably weakened so that the pressure of the liquid bursts the hose. Also, by reason of the inert material in the liner, the hose is stiff and difficult to handle and the liner is apt to separate from the adjacent layer of fabric.

Another objection to this type of hose is that light colored or clear liquids, particularly lacquers, are often stained when passing through the hose. Consequently persons applying such coatings usually resort to hose having a metal liner, which is particularly stiff and cumbersome.

With the above facts in mind, the general object of the present invention is to provide a hose having certain characteristics which make it more suitable for use in spray coating apparatus than the hose heretofore used for that purpose.

A hose made in accordance with the present invention is well adapted to withstand the attacks of solvents, oils and other ingredients of the coating fluid passing therethrough. The composition of the inner layer of the rubber, however, is not modified by the addition of inert material, but it has a comparatively thin inner liner which is not materially affected by the coating fluid and which prolongs the life of the hose, when used in spray coating apparatus, without making the cost of the hose too high. In making the hose, special provision is made to secure effective adhesion between the several layers and to prevent the occurrence of air pockets or bubbles therebetween. The hose thus made has substantially the same pliability and other characteristics as a similarly constructed rubber lined hose, except for its greater resistance to the action of liquids passing therethrough.

Figure 2:
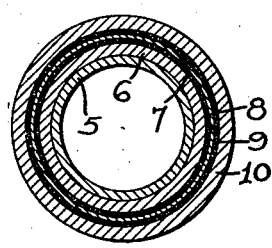

In the accompanying drawing, Fig. 1 is a side elevation of a piece of hose constructed according to the invention, with the several layers successively broken away;

Fig. 2 is a cross section of the hose as indicated by the line 2—2 of Fig. 1.

As indicated in the drawing, a hose constructed according to the present invention is provided with a thin-walled liner 5 of a composition based upon a synthetic resin or gum foundation. Most materials of such composition are considerably less susceptible than rubber to injury through contact with such liquids as are used in spray coating.

Further, according to the invention, a tube 6 of standard rubber compound is formed around the thin-walled liner 5. The combined thickness of the two tubes 5 and 6 is no greater than that of the single liner of rubber composition previously used. It is more resilient, however, because the synthetic resin compound, while stiffer than rubber, is present only as a thin shell, and the tubing 6 contains a larger proportion of rubber than the old type of liner used in spray coating apparatus. Also due to the larger proportion of rubber in the tubing 6, the union between the two combined tubes 5 and 6 and the contiguous layer of fabric 7, which is braided about them, is superior to that between the liner and fabric in the hose formerly used. The synthetic resin compound adheres very satisfactorily to rubber. Although this compound may be somewhat more expensive than rubber, so little of it is used in a hose constructed according to the invention that the increased cost is negligible.

The fabric layer 7 is preferably covered by a layer of rubber ribbon 8 and this is then covered by a second layer of fabric 9. The hose is then covered by an outside layer of rubber 10 in order to protect the fabric and to give the hose a more presentable appearance.

In carrying out the invention, the preferred synthetic compound used as the principal constituent of the inner liner 5 is a reaction product of halogen olefins and alkaline polysulphides.

Such material has the desirable qualities of rubber to a remarkable degree, but is unlike rubber in that it is unaffected by contact with most solvents and oils. In making the liner 5, I also prefer to use a suitable filler, vulcanizing and processing agents, and a small proportion of rubber. The latter is also an aid in processing and is not present in sufficient quantity to adversely affect the nature of the resuling compound.

One formula for making the liner is as follows:

| | Pounds |
|---|---|
| Reaction product of ethylene dichloride and sodium polysulphide | 50 |
| Zinc oxide | 62½ |
| Smoked sheet rubber | 2½ |
| Stearic acid | ½ |
| Diphenylguanidine, NHCH (C₆H₅NH) | ⅛ |

The above ingredients are milled together for about thirty minutes while the temperature is milled together for about thirty minutes while the temperature is maintained at about 130° F.

In manufacturing hose according to the invention, the tubing 5, which is comparatively thin, is first formed from the compound as above described by an extruding machine. The tubing 6 is then super-imposed upon the tubing 5 by means of what is known as an insulating machine. The tubing 6 is composed of a more or less standard rubber compound which is made up of more than fifty percent rubber, the balance being filler and a small proportion of vulcanizing and processing agents.

The layer of cotton fabric 7 is next braided upon the tubing 6 by the usual type of braiding machine used for this kind of work. The application of this braid is utilized in a novel manner to expel any air pockets which might exist between the contiguous surfaces of the tubings 5 and 6. After air under pressure is introduced into the liner 5, the ends of the latter are entirely sealed so that the pressure will be retained therein. One end of the surrounding tubing 6 is likewise closed by tying a short length of cord around it or by similar means. The other end of the tubing 6 is left open. The end at which both tubes are closed is then introduced into the braiding machine. As the application of the braid progresses from one end of the hose to the other, its pressure forces the tubing 6 into close contact with the outer surface of the tubing 5, which is prevented from collapsing by the air pressure within it. Thus, any air which may exist between the two tubings 5 and 6, is progressively forced toward the open end of the tubing 6 and expelled into the atmosphere as the braiding operation is completed.

The hose is then again passed through a braiding machine. As it enters the same, the layer of rubber ribbon 8 is folded around the fabric layer 7 and the second fabric layer 9 is then applied. The purpose of the rubber 8 is to prevent friction between the two plies of fabric 7 and 9 and also to bind them closely together.

The outer coating of rubber composition 10 is then applied with the same type of insulating machine which is used for the application of the tubing 6 over the tubing 5. The composition of the outer coating 10 may be substantially the same as that of the tubing 6.

After the outer coating 10 has been applied, the hose is in its final form and has only to be cured before it is ready for use. It is cured for about fifty minutes under forty pounds of steam, which has a temperature of approximately 286° F.

While the hose as herein described is believed to be best adapted to meet average conditions in its use in spray coating, it is apparent that additional plies of fabric and additional layers of tubing may be provided or the thickness or composition of such layers may be somewhat modified without departing from the scope of the invention as claimed.

What I claim is:

In a hose having a fabric layer, a laminated liner layer adjacent said fabric layer, the innermost lamination of said liner layer consisting of synthetic material having a greater resistance to corrosive action of petroleum solvents, but less bonding strength with fabric than rubber, and an outer lamination of rubber bonded to said inner lamination and serving to bond the inner lamination to the fabric layer, the laminations of said liner layer being of substantial thickness.

CHARLES W. GREENE.